UNITED STATES PATENT OFFICE.

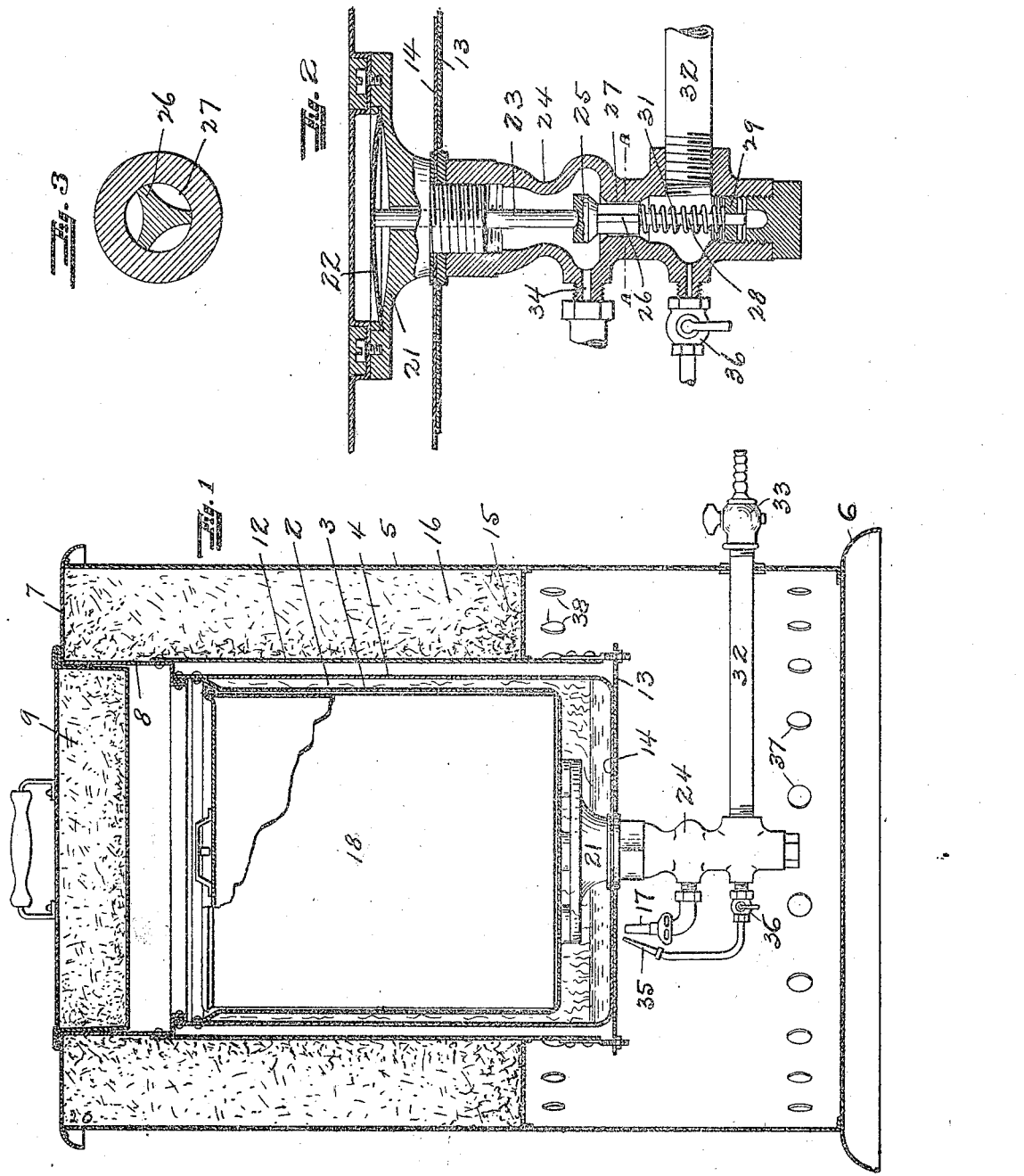

ARTHUR J. KERCHER, OF BERKELEY, CALIFORNIA, ASSIGNOR TO BERKELEY ELECTRIC COOKER COMPANY, OF BERKELEY, CALIFORNIA, A CORPORATION OF CALIFORNIA.

COOKER.

1,194,029.

Specification of Letters Patent.

Patented Aug. 8, 1916.

Application filed January 16, 1915. Serial No. 2,672.

*To all whom it may concern:*

Be it known that I, ARTHUR J. KERCHER, a citizen of the United States, and a resident of Berkeley, county of Alameda, and State of California, have invented a certain new and useful Cooker, of which the following is a specification.

The invention relates to cookers in which the temperature is automatically maintained substantially constant.

An object of the invention is to provide a cooker in which the amount of heat supplied is automatically regulated to maintain the temperature within the cooking chamber substantially constant.

In my prior U. S. Patent No. 1,047,418, dated December 17, 1912, I have shown a cooker in which the temperature of the cooking vessel is maintained substantially constant by automatically supplying heat and cutting off the supply of heat to the cooker. The present cooker however operates to vary the amount of heat supplied so that it corresponds substantially to the amount of heat being consumed or radiated or lost. In the patented type of cooker, the heat is preferably derived from an electric current, the circuit of which is opened and closed by variations in temperature in the cooking vessel, it being preferable and more economical to open and close the circuit than to vary the current by inserting resistances. In the present type of cooker, in which the supply of heat is to be varied, rather than established and cut off, I prefer to use burning gas, hot air or gases or steam as the heat supply. The rate of flow of these fluids can be more economically controlled than the rate of flow of an electric current.

The invention possesses many advantageous features, some of which, with the foregoing, will be set forth at length in the following description, where I shall outline in full that form of the invention which I have selected for illustration in the drawings accompanying and forming part of the present specification. The novelty of the invention will be included in the claims succeeding said description. From this it will be apparent that I do not limit myself to the showing made by such drawings and description, as I may adopt many variations within the scope of my invention as set forth in said claims.

Referring to said drawings: Figure 1 is a vertical section of one form of the cooker of my invention adapted to be heated by a gas flame. Fig. 2 is a vertical section of the means for controlling the flow of gas, the parts being in their normal inoperative position. Fig. 3 is a cross section taken on the line A—A Fig. 2.

The cooker of my invention comprises a receptacle 2 having a double wall, the walls 3—4 being spaced apart to form a closed chamber therebetween. This chamber extends around the sides of the receptacle and across the bottom. The chamber is vacuumized and a quantity of water or other liquid is placed therein. The receptacle 2 is inclosed in the outer shell 5, which rests on a suitable base 6. The shell is larger in diameter than the receptacle, and the annular space between the two is closed at the top by the annular top plate 7 which is provided at its inner edge with a depending flange 8, to which the receptacle is secured at its upper end. A cover 9 fits into the flange 8 and closes the cooking chamber. Secured to the flange 8 is a metallic cylinder 12 which surrounds the entire receptacle and bolted to the lower end of the cylinder 12 is a plate 13 which bears against the lower wall 14 of the double walled receptacle. The plate 13 assists in supporting the receptacle. The annular space between the shell 5 and the cylinder 12 is divided at a point slightly above the lower end of the cylinder 12 by a horizontally disposed annular wall 15, and the annular space above the wall 15 is filled with a suitable heat insulating material 16.

Means are provided for heating the receptacle 2 and its contents and for controlling the amount of heat supplied so that the temperature of the receptacle is maintained substantially constant. In the present construction, in which the receptacle is heated by a gas flame, a gas burner 17 is arranged below the receptacle and within the shell 5, so that the flame is directed against the plate 13, and the heat conducted therefrom to the receptacle. By directing the flame against the plate 13 the lower wall of the receptacle is not exposed to the direct action of the flame.

When the heat is applied to the receptacle, the water therein becomes heated and boils and when it reaches the boiling point the vacuum in the chamber is destroyed. The steam from the water passes to all parts of the chamber, distributing the heat evenly to all parts thereof and thereby permits the food in the vessel 18 to become quickly and evenly heated. When the food is cold a large amount of heat is absorbed by it, but as it reaches the cooking temperature, a small amount of heat only is necessary to maintain it at such temperature. It is seen, therefore, that variations in temperature in the receptacle 2 are accompanied by variations in pressure, and means are provided for varying the amount of heat supplied to the receptacle in proportion to the variations of pressure therein.

The flow of the heating fluid, which may be gas, hot air or other gases or steam, is controlled by means of a valve which is operated by variations in pressure within the receptacle. Arranged within the steam chamber or vacuumized chamber is a casing 21 in which is arranged a diaphragm 22, one side of the diaphragm being exposed to the pressure in the chamber. Engaging the other or lower side of the diaphragm is a plunger 23 which extends through the casing 21 into the valve casing 24, and into contact with the valve 25. The lower end of the plunger is preferably rounded and seats in a cupped depression in the valve. The valve and the valve seat are tapered and the valve is provided with dependent guides 26 which are disposed in the gas passage 27, the guides being of such shape (Fig. 3) that when the valve is unseated, the gas is free to pass through the passage.

Secured to the under side of the valve 25 is a valve stem 28 which extends downward through the vertically adjustable nut 29, and surrounding the stem is a coiled spring 31 bearing at one end against the nut 29 and at the other end against the guides 26. The spring opposes the downward movement of the diaphragm due to an increase in pressure within the chamber, and by varying the compression of the spring by means of the nut 29 different positions of the valve for a given pressure in the chamber may be obtained. Since in a closed receptacle containing steam the pressure varies with the temperature, the range of temperature in the chamber may be varied by varying the compression of the spring. The diaphragm is preferably of the buckling type which is normally bowed downwardly, so that it exerts a pressure against the spring, and when the pressure in the chamber is increased this pressure, in combination with the pressure exerted by the diaphragm, is opposed to the pressure of the spring.

Gas is admitted to the valve chamber below the valve 25 through the pipe 32 which extends through the shell 5 and is provided with a cock 33. The burner 17 communicates with the valve casing above the valve through the conduit 34. A pilot or ignition burner 35 provided with a cock 36 connects to the valve casing below the valve. When gas to be burned is used as the heating element, the shell 5 is provided adjacent the bottom with a plurality of apertures 37 for admitting air and above the burner is provided with a plurality of apertures 38 to permit the discharge of the products of combustion.

The operation of the cooker is as follows: When the cooker is cold the diaphragm is in its upward position and the valve is unseated, as shown in Fig. 2. The cock 33 is turned and the burners 17 and 35 lighted. The water in the chamber becomes heated and steams, and the pressure within the vacuumized chamber increases, causing the diaphragm to move downwardly, thereby lessening the supply of gas to the burner 17, and consequently lessening the supply of heat to the receptacle. When the burner is first ignited and the cooker is cold, the heat supply is at the maximum, and heat is supplied more rapidly than it is imparted to the food, and as a consequence the temperature of the chamber may become sufficiently high to increase the pressure therein to such a point that the valve will be closed, in which case the pilot light ignites the gas when the valve is again opened. After the cooker has been in use for a short time, however, the valve comes to a position of substantial rest at such a point that the amount of heat supplied is just sufficient to compensate for the heat consumed in cooking the food and the heat lost.

I claim:

1. A cooker comprising a shell, a cooking receptacle comprising an annular closed chamber arranged within said shell and spaced apart therefrom, a metallic cylinder surrounding said receptacle and supported within said shell, a plate secured to the lower end of said cylinder and bearing against the bottom of said receptacle, and means for heating said receptacle.

2. A cooker comprising a shell, an annular plate having a depending flange at its inner edge partly closing the top of said shell, a cooking receptacle comprising an annular closed chamber arranged within the shell and secured at its upper edge to said flange, a metallic cylinder surrounding said receptacle secured at its upper edge to said flange, a plate secured to the lower edge of the cylinder and bearing against the bottom of said receptacle, a filling of heat insulating material between said cylinder and shell, a cover arranged to fit inside of said flange, and means for heating said receptacle.

3. In a cooker, a receptacle comprising an annular vacuumized chamber, a cylinder surrounding and spaced from said receptacle, a shell surrounding and spaced from said cylinder, a downwardly turned flange on said shell to which said receptacle and cylinder are attached, and means for heating said receptacle.

4. In a cooker, a receptacle comprising an annular vacuumized chamber, a cylinder surrounding and spaced from said receptacle, a shell surrounding and spaced from said cylinder, a downwardly turned flange on said shell for supporting said receptacle and cylinder, a closure for said cooker arranged to fit within said flange and means for heating said receptacle.

5. In a cooker, a receptacle comprising an annular vacuumized chamber, a wall forming a second annular chamber about said receptacle, a shell surrounding and spaced from said wall, a flange on said shell for supporting said receptacle and wall, a filling of heat insulating material between said shell and said wall and means for heating said receptacle.

In testimony whereof, I have hereunto set my hand at San Francisco, California, this 8th day of January, 1915.

ARTHUR J. KERCHER.

In presence of—
H. G. Prost,
J. B. Gardner.